(12) United States Patent
de Groot et al.

(10) Patent No.: US 12,328,483 B2
(45) Date of Patent: Jun. 10, 2025

(54) MEDIA DATA TRANSMISSION AND PROCESSING SYSTEM AND METHOD FOR OPERATING SUCH SYSTEM

(71) Applicant: EVS Broadcast Equipment SA, Seraing (BE)

(72) Inventors: Jan-Willlem de Groot, Oisterwijk (NL); Peter Schut, Tilburg (NL)

( * ) Notice: Subject to any disclaimer, the term of this patent is extended or adjusted under 35 U.S.C. 154(b) by 129 days.

(21) Appl. No.: 18/166,625

(22) Filed: Feb. 9, 2023

(65) Prior Publication Data

US 2023/0276107 A1    Aug. 31, 2023

(51) Int. Cl.
 *H04N 21/643* (2011.01)
 *H04L 43/106* (2022.01)
 *H04L 65/65* (2022.01)

(52) U.S. Cl.
 CPC ..... *H04N 21/64322* (2013.01); *H04L 43/106* (2013.01); *H04L 65/65* (2022.05)

(58) Field of Classification Search
 CPC .. H04N 21/64322; H04L 65/65; H04L 43/106
 See application file for complete search history.

(56) References Cited

U.S. PATENT DOCUMENTS

| | | | |
|---|---|---|---|
| 2015/0139251 A1* | 5/2015 | Tzeng | H04L 1/00 370/503 |
| 2020/0280750 A1* | 9/2020 | Nakamura | H04L 65/764 |

OTHER PUBLICATIONS

Extended European Search Report, Application No. EP22156004.8, Jul. 21, 2022 (7 pages).
Kero Nikolaus et al.; "Enhanced Redundancy of ST 2059-2 Time Transfer Over ST 2022-7 Redundant Networks"; SMPTE Motion Imaging Journal, vol. 128, No. 6; Jul. 1, 2019; pp. 21-29.
Kero Nikolaus et al.; "Performance and Reliability Aspects of Clock Synchronization Techniques for Industrial Automation"; Proceedings of IEEE, IEEE New York, US, vol. 107, No. 6, Jun. 1, 2019; pp. 1011-1026.

* cited by examiner

*Primary Examiner* — Suraj M Joshi
(74) *Attorney, Agent, or Firm* — Ryder, Mazzeo & Konieczny LLC; Douglas J. Ryder

(57) ABSTRACT

A media data transmission and processing system and a method for operating the system is a suggested. The media data transmission and processing system comprises two independent processing cards. The system is configured such that if one of the two processing cards fails, then the system is still capable of one downstream data stream. A key role in place the Master Slave configuration between the two processing cards. The Master processing card is configured to assign a new PTP timestamp and packet counter number to an IP packet currently processed in the Master processing card and to communicate the new PTP timestamp and packet counter number to the Slave processing card, which assigns the same PTP timestamps and packet counter numbers as the Master processing card.

15 Claims, 6 Drawing Sheets

MEDIA DATA TRANSMISSION AND PROCESSING SYSTEM AND METHOD FOR OPERATING SUCH SYSTEM

FIELD

The present disclosure relates to a media data transmission and processing system comprising a redundant data transmission network and a redundant processing unit. Furthermore, the present disclosure relates to a method for operating such a media data transmission and processing system.

BACKGROUND

In video productions, such as sports events or playout systems, the video contributions usually come from more than one physical location. Cameras shooting the event typically are outside of a studio, for instance in a sports stadium. The camera signals are transferred to a video production server. In addition to that, there may be experts and a moderator in the studio discussing the sports event. Their discussion is covered by additional cameras generating further camera streams that are fed into the production server. A production director controls the video production by selecting camera streams, making cuts, and choosing video effects. Additional staff members of the production team may be involved for editing of the program stream, performing video effects etc.

EP 2 870 749 B1 describes a distributed video production and playout system in which processing units are either located in a data center or distributed among various remote locations for performing different tasks required for the video production and play out systems. The video and audio data are exchanged between the processing units by data links transmitting the data as IP packets in an IP network. If the network connecting the processing units involved in a video production fails, then the production output signal is affected or gets lost entirely. Obviously, this is a worst-case scenario that must be avoided, especially for big and expensive sports events, for example a football world championship. One practical approach to avoid such a worst-case scenario is to transport the video signals redundantly across two independent redundant networks.

The IP packets are transmitted across the redundant networks for instance according to a real-time transport protocol (RTP). If an active network currently used in the video production fails, then a processing unit can switch to the redundant backup network. In the broadcast industry the active network is frequently called the RED network and the backup network the BLUE network. This concept is specified in the SMPTE 2022-7 standard, which describes how a processing unit can select between the two networks to select the "better packet", that is a packet without errors, from the two networks or to switch over completely to the redundant backup network if it the data on the main network has many errors or the main network has failed completely. In theory the processing unit can provide a valid output stream if both networks have a lot of errors as long as there is one valid packet in each stream that can be selected by the processing unit. Each data packet has a media content as payload, a PTP timestamp and a packet counter value. The SMPTE 2022-7 stipulates that the packets on both networks need to have exactly the same PTP timestamp and exactly the same packet counter value, which enables the processing unit to identify the correct packet in the backup network if a packet in the currently active network has been detected by a packet selector to be defective and needs to be replaced. Since the media content in these two packets must be the same, the replacement is seamless in the output production stream and invisible for a user. This concept is illustrated in FIGS. 1A-1C and will be explained further below. At this point, we note that the processing unit is a single point of failure, i.e. if the processing unit fails, then no data is available in the downstream network.

In the following, data streams that are compliant with the SMPTE 2022-7 standard will be named briefly as "-7 compliant data streams". Similarly, a device that is capable of replacing a defective packet in one of two redundant networks (RED and BLUE network) by the same packet in the other network, is labeled as "SMPTE 2022-7 compliant device" or briefly as "-7 compliant device". Likewise, the RED and BLUE networks are called SMPTE 2022-7 compliant networks or briefly "-7 compliant networks". It is noted that systems that use the SMPTE 2110 suite of standards also use the -7 type of resilience. Therefore, such systems are also -7 compliant in the sense as explained above and are suitable for implementing the present disclosure.

In view of the problem of a processing unit being a single point of failure in conventional -7 compliant networks, there remains a desire for a media data transmission and processing system that can cope with the failure of the processing unit.

SUMMARY

To this end, the present disclosure takes the concept of SMPTE 2022-7 one step further by a new architecture transmission and processing system by processing the media data of the RED and of the BLUE network in a processing unit that comprises two independent processing cards. The system is configured such that if one of the two processing cards fails, then the system is still capable of providing one downstream data stream.

According to a first aspect the present disclosure suggests a media data transmission and processing system comprising a first and a second data transmission network transmitting the same multimedia data as a first and a second stream of IP packets. The IP packets contain media information, a PTP timestamp and a packet counter number. For every packet in the first stream, the second stream contains a packet with identical media information, PTP timestamp, and sequence number. The packets of the first and the second stream are provided as a first and second input stream to a processing unit comprising a first and a second processing card. The first and the second processing card output a processed first and second output stream, respectively. The first and second processing cards assign new PTP timestamps and sequence numbers to the packets of the first and second output streams. The first and second processing cards are connected by an interconnection. One processing card is configured to act as a Master for the other processing card, which is configured to act as a Slave. The Master and Slave processing cards process the IP packets containing the same media information in a coordinated manner, in particular in a synchronous manner. The Master processing card is configured to assign a new PTP timestamp and packet counter number to an IP packet currently processed in the Master processing card and to communicate the new PTP timestamp and packet counter number to the Slave processing card. The Master processing card is configured to cause the Slave processing card to assign the PTP timestamp and packet counter number received from the Master processing card to the packet of the second stream that contains the same media information than the IP packet currently processed in the Master processing card.

The system is configured such that if one of the two processing cards fails, then the system is still capable of one downstream data stream. A key role in place the Master Slave configuration between the two processing cards.

In an embodiment the Master and the Slave processing cards are connected with an interconnection to exchange command signals. The command signals enable the setup of the Master Slave configuration between the processing cards as well as communicating PTP timestamps and packet counter number of values from the Master processing card to the Slave processing card In some cases there is an independent PTP clock for red and blue and also here the system can share the locking information over the connection when one of these PTP Masters fail. In an advantageous embodiment the Master and the Slave processing cards both comprise a processing block processing the first and second input data stream to generate the first and second output data stream. A first cross-connection connects the output of the processing block of the Master processing card with the input of the processing block of the Slave processing card and a second cross-connection connects the output of the processing block of the Slave processing card with the input of the processing block of the Master processing card. The cross connections enable the transmission of processed data packets from one processing card to the other processing card.

It has been found particularly advantageous to loop through the processed data packets provided by the first and second cross-connection are looped through the processing block of the Master and Slave processing card, respectively. The looped through processed data packets replace and output data packets if the one processing card has failed or it receives one or a plurality of erroneous data packets from an input network.

In a further embodiment each processing card comprises a probing engine analyzing the content of the input stream. The probing engine selects to output the processed data packets received from the other processing block via the first or second cross-connection if the probing engine detects an erroneous IP packet in the input stream.

Advantageously, the probing engine is configured to analyze the data content in the audio and/or video baseband domain to detect whether a data packet meets predefined quality criteria. This kind of analysis can be applied in processing units having two processing cards, while, for instance, the -7 compliant method is only comparative in processing units having a single processing card.

In a useful implementation the probing engine is configured to perform at least one of cyclic redundancy checks, freeze-frame detection, black frame detection, audio carrier loss and video carrier loss.

According to a second aspect the present disclosure suggests a method for operating a media data transmission and processing system according to a first aspect of the present disclosure. The method comprises ingesting into a first processing card a first input stream of IP packets, wherein the IP packets contain media information, a PTP timestamp and a packet counter number;
ingesting into the second processing card a second input stream of IP packets, wherein the IP packets contain media information, a PTP timestamp and a packet counter number;

processing the first and second stream of IP packets in the first and second processing card, respectively, to produce first and second output streams;
determining one processing card as a Master processing card and the other processing card as a Slave processing card;
assigning new PTP timestamps and packet counter numbers to the first and second output streams such that the new PTP timestamps and packet counter numbers generated in the Master processing card are also assigned to the data packets processed in the Slave processing card.

According to an advantageous development the method further comprises
analyzing each input data stream to detect one or several erroneous data packets; and
replacing the one or several detected erroneous data packets in one input data stream by processed data packets with the same media information from the other input stream.

Advantageously the step of analyzing each input data stream involves analyzing the data content of the input stream in the audio and/or video baseband domain to detect whether a data packet meets predefined quality criteria. This kind of analysis can be applied in processing units having two processing cards.

In a further development of the method the step of analyzing each input data stream comprises performing at least one of cyclic redundancy checks, freeze-frame detection, black frame detection, audio carrier loss and the video carrier loss.

In an advantageous embodiment the method further comprises
assigning a Master status to a processing card that has finished booting faster than the other processing card;
assigning the other processing card a Slave status. This approach for establishing a Master Slave structure is very flexible.

In a particularly useful implementation the method further comprises, if the processing card that has initially been assigned with the Master status fails, assigning the Master status to the processing card that initially has been assigned with the Slave status. In this way the output streams can be provided without any glitches or even interruptions.

For further enhancing the reliability and operational safety of the media data transmission and processing system the method may comprise
replacing a failed processing card with the new processing card and
assigning the new processing card the Slave status. Again, with this implementation an uninterrupted operation of the system is secured. The output data streams of the system remain unaffected and for a viewer of the program the failure of the processing card and its replacement is invisible.

Finally, according to a third aspect, the present disclosure suggests a distributed video production system comprising a media data transmission and processing system according to the first aspect of the present disclosure. The distributed video production system realizes the same advantages that have been mentioned with reference to the media data transmission and processing system according to the first aspect of the present disclosure.

BRIEF DESCRIPTION OF DRAWINGS

Exemplary embodiments of the present disclosure are illustrated in the drawings and are explained in more detail in the following description. In the figures the same or similar elements are referenced with the same or similar reference signs.

The same or similar elements in the figures are labeled with the same or similar reference signs. The flow of data streams is the symbolized in the figures by arrows.

In the following the terms "IP packet" and "data packet" are used synonymously. The same applies to "media content" and a "media data".

DETAILED DESCRIPTION

Figure 1A:
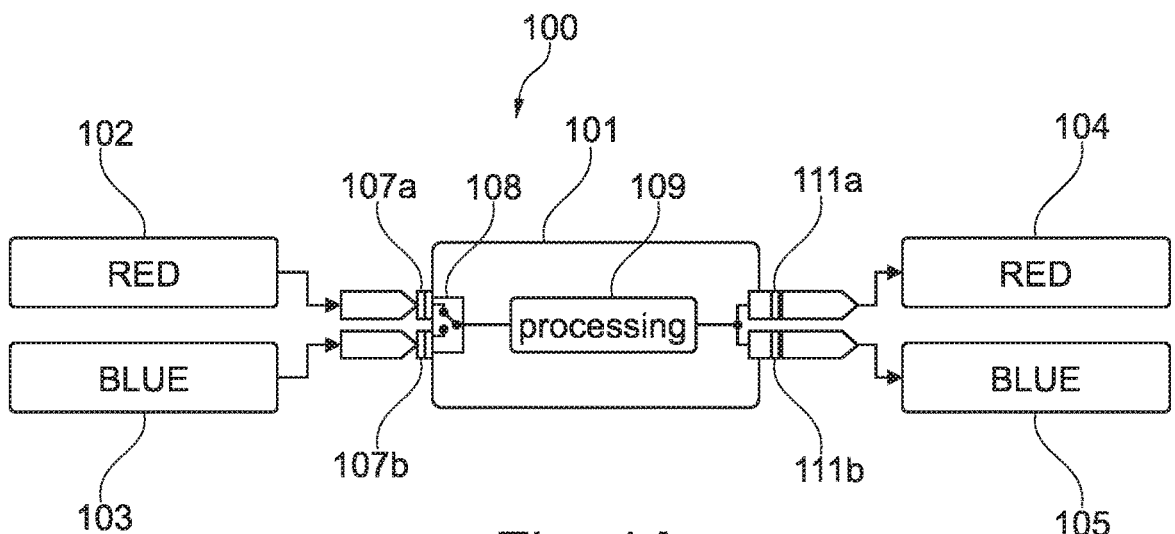
FIG. 1A-1C illustrates the architecture of a conventional -7 compliant media data transmission and processing system.

FIG. 1A shows a transmission system 100 and, in particular, the environment of a -7 compliant device 101 performing data processing on data (processing unit) received from a first network 102 and from a second network 103. Both networks provide data streams according to the IP protocol at a data rate of 100 GB to the processing unit 101. In other embodiments the data rate of the networks is smaller or bigger than 100 GB. The networks 102, 103 and other networks described in the present disclosure are for example Ethernet networks. The -7 compliant device 101 is a processing unit processing the received data. The device 101 performs for instance color gamut correction on the received data. The device 101 outputs two copies of each processed data package. The first copy of the processed data package is contained in the data stream that is provided to a network 104. The second copy of the processed data package is contained in another data stream that is provided to a network 105. The two streams are also known as -7 compliant streams. The network 102 represents a main or active network, which means that the device 101 processes only the data packets from network 102 if the data packets are error-free. The network 102 corresponds to the above-mentioned RED network. The network 103 provides the same data packets as a backup network which are used by the device 101 if an erroneous data packet is detected by the device 101 in the data stream provided by the RED network 102. The same applies mutatis mutandis if several erroneous data packets are detected by the device 101 in the data stream provided by the RED network 102. If the RED network complete fails, then only the data packets from network 103 are used by the device 101. In the terminology introduced above, the backup network 103 corresponds to the BLUE network.

The RED network 102 and the BLUE network 103 are connected to the device 101 at a connector 107a and 107b, respectively. A packet selector 108 connects by default with the RED network 102 and transmits the received data packets to processing block 109 where data processing is performed. The processing block 109 contains at least one processor performing one kind of data processing that is required in a video production, for instance the above-mentioned color gamut correction. However, any other kind of data processing could be performed as well. The important point is that the processed data outputted from the processing block 109 are not identical to the data received by the processing block 109. The processing block 109 outputs two copies of each processed data packet to connectors 111a and 111b. Furthermore, the processing block 109 assigns identical PTP timestamps and packet counter numbers to each copy of the data packets. Consequently, the two copies of the data packets contain the same media content and have an identical timestamp and packet counter number. The connectors 111a, 111b are connected with the network 104 and 105, respectively. The networks 104, 105 are for instance 100G Ethernet networks. In an alternative embodiment the process data packets could also be outputted into the networks 102 and 103 as Ethernet is bi-directional.

The data streams provided by the networks 102 and 103 are -7 compliant, i.e. for each data packet on the RED network 102 there is an identical data packet on the BLUE network 103 carrying the same media content and having the same timestamp and packet counter number. Likewise, the two data streams outputted by the processing block 109 are -7 compliant as well. Consequently, the networks 104, 105 function as RED and BLUE networks, respectively, for a downstream -7 compliant processing device.

Figure 1B:
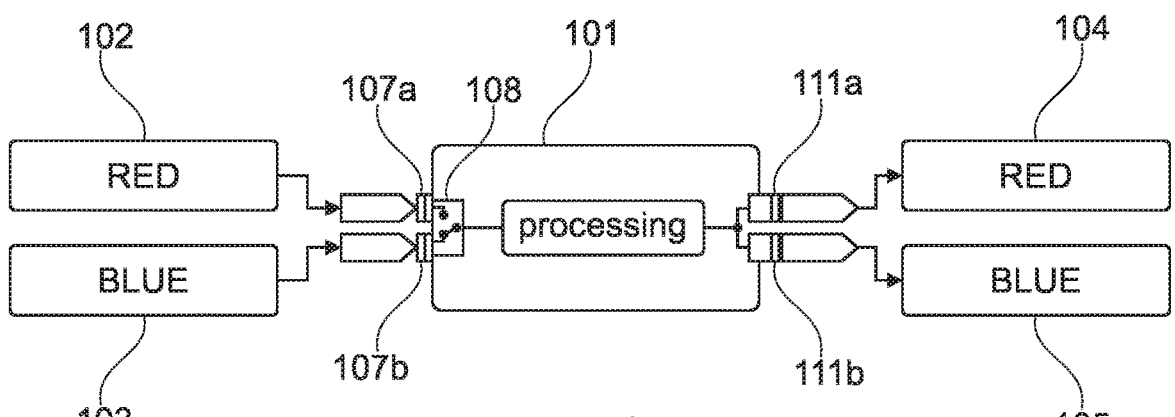

The packet selector 108 performs algorithms to detect erroneous packets on the RED network 102 and complete network failures. The response of the packet selector 108 to a failure of network 102 is illustrated in FIG. 1B. As soon as the network selector 108 detects the failure of network 102, the network selector 108 switches from connector 107a to connector 107b. Appropriate buffers (not shown) within the device 101 enable providing the processing block 109 with an uninterrupted and seamless stream of data packets. "Seamless" in this context means that if data packet number N was the last correct data packet from the RED network 102, the next data packet N+1 is already received from the BLUE network 103. For a video production the failure of network 102 has no visible consequences because device 101 continues outputting two -7 compliant data streams to the networks 104, 105, respectively. Consequently, downstream from device 101, the failure of network 102 is completely compensated. As a result, the media data transmission and processing system is more reliable than a system without redundant -7 compliant networks. Nevertheless, there remains a problem with this kind of architecture as it will be explained with reference to FIG. 1C.

Figure 1C:
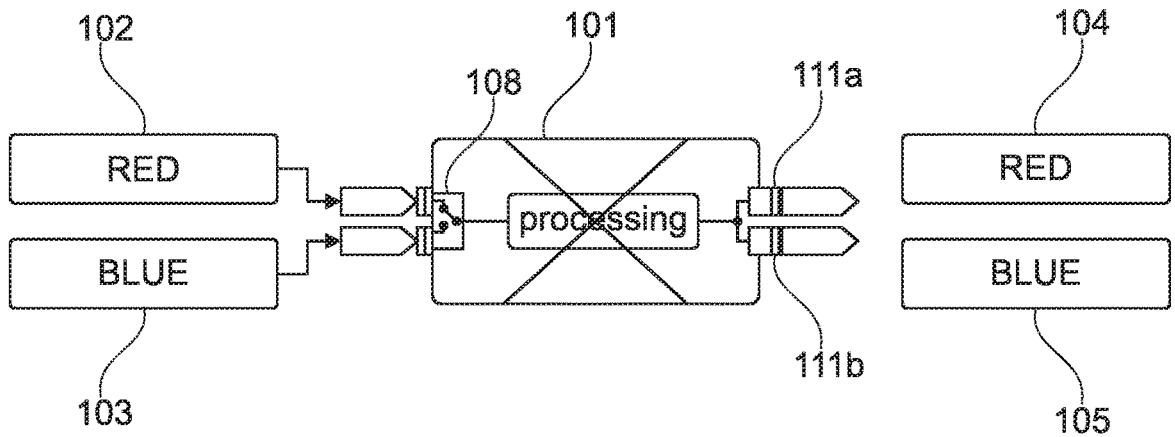

FIG. 1C illustrates a situation where the -7 compliant device 101 fails. In consequence of that, no data can be provided to the networks 104, 105 and downstream devices receive no more data. Thus, device 101 is a single point of failure and the video production is interrupted. As mentioned above, this worst-case scenario is to be avoided.

The media data transmission and processing system according to the present disclosure aims at improving the situation by further enhancing the reliability of the system. In order to overcome the single point failure problem in conventional media data transmission and processing systems, the present disclosure suggests using a processing unit that comprises two fully independent processing cards that could be located in the same encloser powered by a redundant power supply or in two completely different racks in different rooms to provide an even higher resilience.

Figure 2:
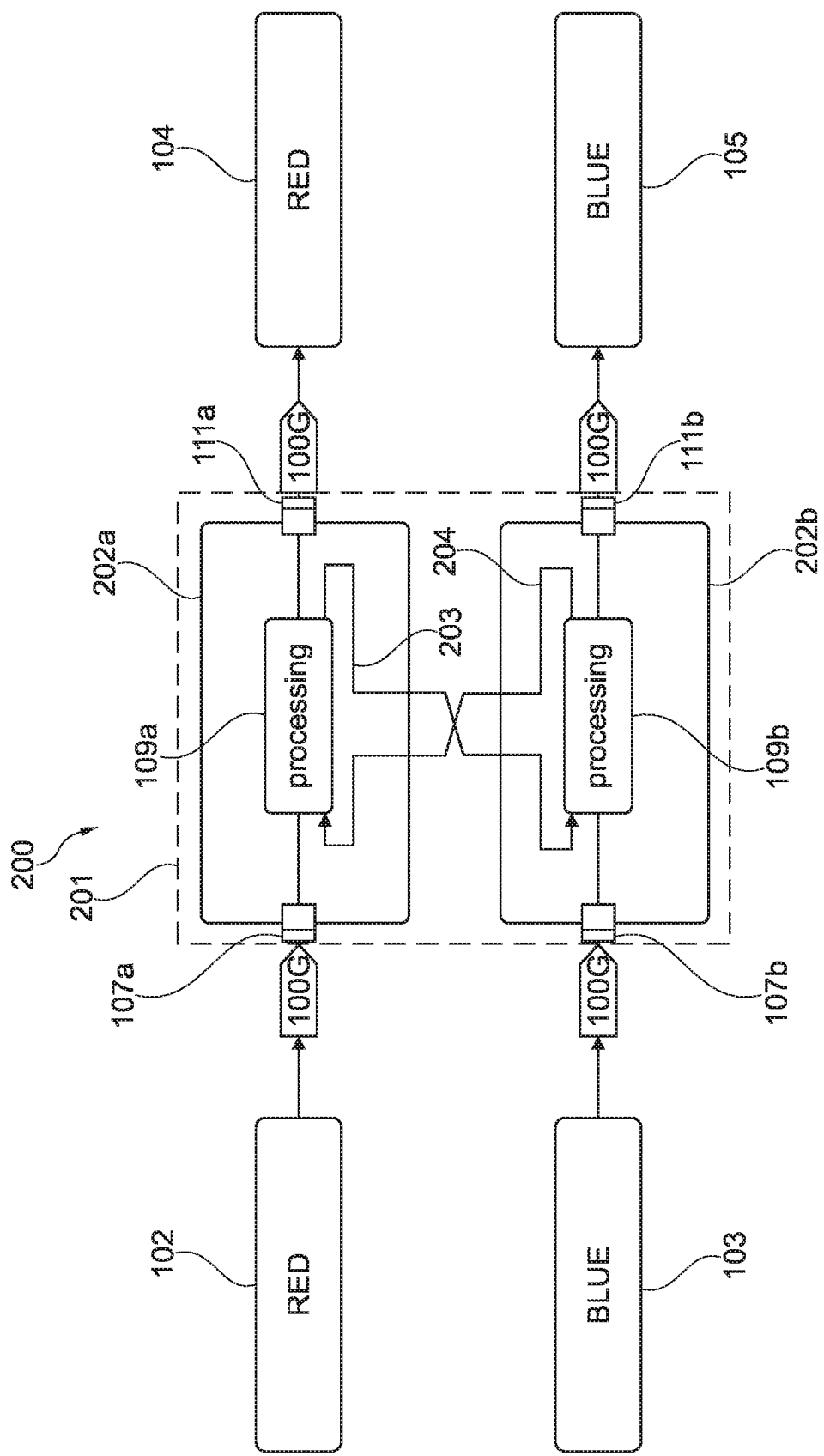
FIG. 2 illustrates the architecture of an alternative media data transmission and processing system.

FIG. 2 shows the architecture of a media data transmission and processing system 200 comprising a processing unit 201 that integrates two independent processing cards 202a and 202b. The processing unit 201 receives two -7 compliant data streams from the RED network 102 and BLUE network 103. The data streams from networks 102, 103 are received by the processing unit 201 at connectors 107a and 107b. The input data received that the connectors 107a, 107b are processed in processing blocks 109a, 109b, respectively, and supplied as processed output data at connectors 111a, 111b. From the connectors 111a, 111b the processed output data are provided to downstream networks 104, 105. If everything functions properly in the system 200, then the redundant input data flow downstream in a parallel manner from network 102 to network 104 and from network 103 to network 105. However, without any additional measures the processing cards 202a, 202b are single points of failure for the RED and BLUE networks. In order to overcome this single point of failure problem, the system 200 further comprises cross-connections between the processing cards 202a and 202b. A first cross-connection 203 connects the output of processing block 109a with the input of processing block 109b. A second cross-connection 204 connects the output of processing block 109b with the input of processing card 109a. As a result, processing block 109a receives at its input unprocessed data from the RED network 102 and processed data from the processing block 109b. Processing block 109b receives at its input unprocessed data from the BLUE network 103 and processed data from the processing block 109a.

To explain the functioning of the system 200, it is assumed that the RED network 102 supplies erroneous data to the processing card 202a. In this situation the processing block 109a detects erroneous or missing data in the input data stream received at the connector 107a. In response to that, the processing block 109a loops through the output data received from processing block 109b across the cross-connection 204. In this way it is achieved that the networks 104, 105 are supplied with redundant data, even though network 102 has failed intermittently or continuously. Due to this configuration, the processing cards 202a and 202b are no longer a single point of failure and therefore the system 200 is more reliable than the system 100 described with reference to FIGS. 1A-1C.

The selection criteria to switch between local input and backup input is based on a probing engine integrated in processing cards 109a, 109b that analyses the data on content in the audio and video baseband domain. It uses CRC checks, freeze frame and black detection algorithms as well as full audio and video carrier loss to detect erroneous and missing packets in the streams provided by red network 102 and blue network 103. The concept of media data transmission and processing system 200 is implemented in a protection switch that is commercially available under the brand name "Neuron Protect PXG1616 Switch" from EVS. The PXG1616 is a Neuron based protection switch that solves the single point of failure dilemma most ST2022-7 based networks have.

The unit accepts both SDI and IP streams in either ST2022 or in ST2110 formats. By use of a data path cross-connection using 4 SFP+ cages, the two boards exchange media data between the main and the backup unit.

This means that each unit has a data stream from either the RED or the BLUE network and copy this stream to the opposite member of the dual card solution.

However, it is important to note that the processing cards 202a, 202b assign PTP timestamps and packet counter numbers individually. In consequence, the IP packets do not receive identical PTP timestamps and packet numbers even though the processing cards are locked to a PTP protocol because small differences in the locking mechanism due to the analog behavior of the electronic components lead to small differences in the timestamps and packet counter numbers. However, the SMPTE 2022-7 standard does not tolerate even small differences. Therefore, there remains a need for a system and a method that assure equal timestamp and packet counter when both processing cards are running, and a -7 compliant redundant stream is provided by each processing card.

To overcome that problem the present disclosure suggests using an interconnection between processing blocks 109a and 109b to enable an intelligent Master—Slave function between the processing blocks 109a, 109b.

Figure 3:
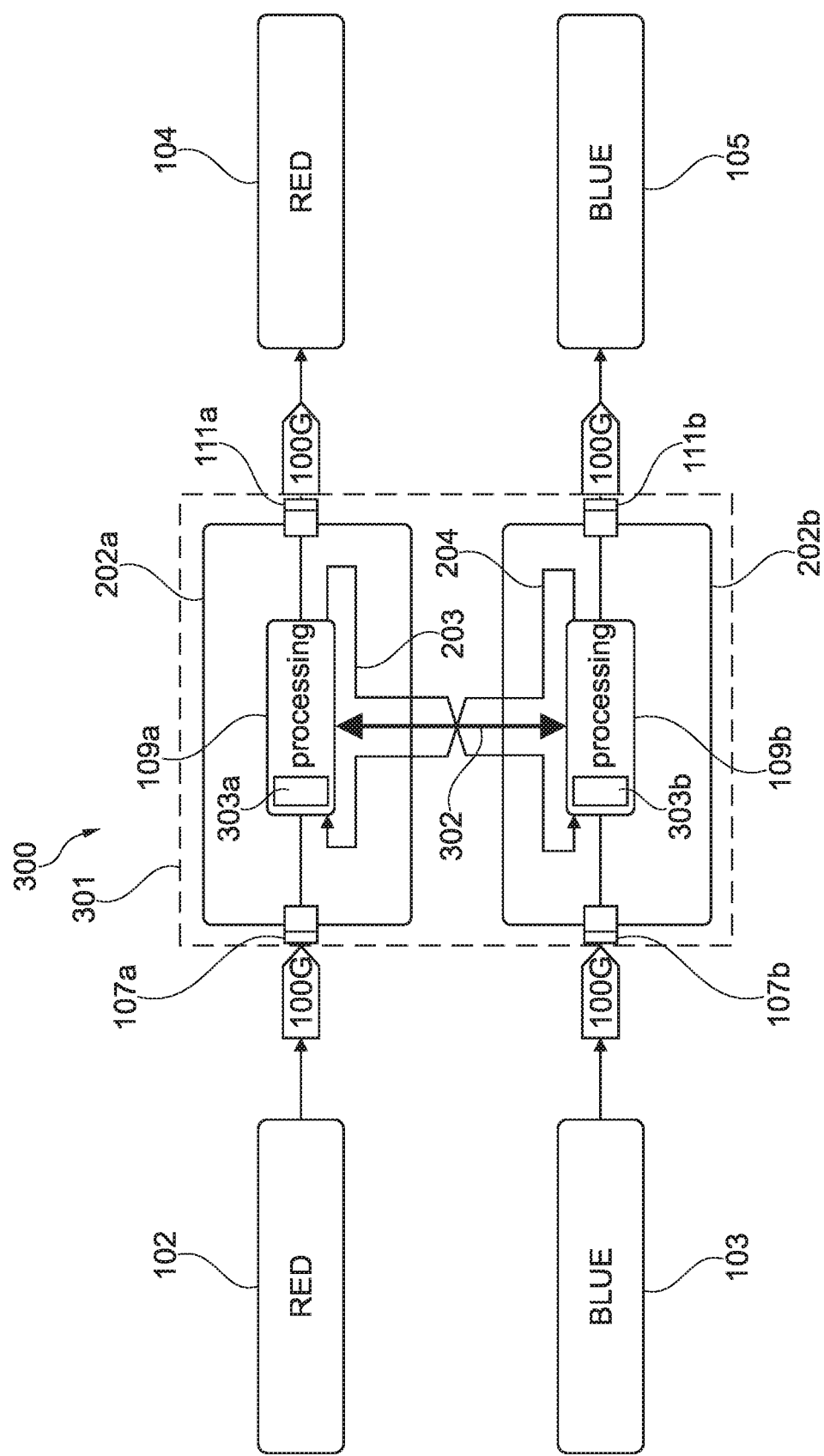
FIG. 3 illustrates the architecture of a media data transmission and processing system according to the present disclosure.

A media data transmission and processing system 300 according to the present disclosure is illustrated in FIG. 3. The system 300 comprises a processing unit 301. The processing unit 301 integrates two processing cards 202a, 202b, which include processing blocks 109a, 109b. A bidirectional interconnection 302 connects the processing blocks 109a and 109b. If the system 300 is running normally, the processing cards 202a, 202b receive -7 compliant streams from the networks 102, 103.

In each processing block 109a, 109b a probing engine 303a, 303b is integrated. The probing engines 303a, 303b select an input stream to be processed by the processing block 109a, 109b but instead of applying the -7 methodology, the "good" stream is selected based on a content baseband video probing. Depending on the quality of the the streams received at local input connectors 107a and 107b either these streams are selected or, when in error, the respective probing engine 303a, 303b switches seamlessly to the backup signal arriving trough cross-connection 203 or 204. Eventually, the receiving selection criteria of the -7 methodology is removed in favor of a baseband probing method because -7 selection methods only work on single unit applications.

Firstly, processing block 109a is described. On the one hand processing block 109a receives from connector 107a the data stream from RED network 102 and on the other hand via cross-connection 204 processed output data from processing block 109b as a backup stream. Instead of applying a -7 methodology to select a "good" input stream by selecting the one or the other input to processing block 109a, probing engine 303a performs a content baseband video probing. By default, probing engine 303a selects the data stream received from connector 107a as input stream for processing block 109a. If the probing engine 303a detects that the quality of one or several data packets received at a connector 107a does not meet predefined quality criteria, then probing engine 303a seamlessly switches to the backup stream received via cross-connection 204. If many or all data packets received at a connector 107a are defective, then probing engine 303a switches permanently to the backup stream received via cross-connection 204 until the RED network 102 provides again data packets that meet the predefined quality criteria applied by the probing engine 303a.

Secondly, processing block 109b is described. On the one hand processing block 109b receives from connector 107b the data stream from BLUE network 103 and on the other hand via cross-connection 203 processed output data from processing block 109a as a backup stream. Instead of applying a -7 methodology to select a "good" input stream by selecting the one or the other input to processing block 109a, probing engine 303b performs a content baseband video probing. By default, probing engine 303b selects the data stream received from connector 107b as input stream for processing block 109b. If the probing engine 303b detects that the quality of one or several data packets received at a connector 107b does not meet predefined quality criteria, then probing engine 303b seamlessly switches to the backup stream received via cross-connection 203. If many or all data packets received at connector 107b are defective, then probing engine 303b switches permanently to the backup stream received via cross-connection 203 until the BLUE network 103 provides again data packets that meet the predefined quality criteria applied by the probing engine 303b.

As a result, the -7 methodology for selecting input data packets for processing is replaced in favor of a baseband probing method. In this way a disadvantage of the -7 selection method can be overcome. Namely, the -7 selection methods only works on processing devices 101 having a single processing card 109. This type of processing devices has been described with reference to FIGS. 1A-1C.

Even though processing unit 301 is capable of overcoming the single point of failure problem of processing units having only a single processing card there remains a need to make the downstream signals in the output streams of processing unit 301 provided at connectors 111a, 111b become -7 compliant. To be -7 compliant, the data packets contained in the output streams provided by the processing unit 301 at the connectors 111a and 111b need to have exactly the same timestamp, packet counter, and content. To this end a Master Slave structure needs to be established between the processing cards 202a, 202b, and this is where the link 302 comes into play.

Depending on the power up sequence of the processing cards 202a, 202b, either processing card can become Master or Slave. The processing card that is powered up first—the first processing card—will ask for an acknowledgement of the other processing card—the second processing card—being there. If no response from the second processing card is received the first processing card will enter into a Master status waiting for the second processing card to ask for an acknowledgement. This handshake procedure will determine which processing card is Master and which one is Slave. After these rules and classes are set, the Master processing card will start transmitting reference Slave commands for the Slave processing card to follow. These reference Slave commands are communicated through the interconnection 302 and are used to align packet counter and timestamp information when no PTP is available like with SDI inputs. The reference Slave commands make sure that if the two processing cards 202a, 202b are each locked to a reference clock, but the reference clock sources are out of sync that the hysteresis differences between the two processors drop or repeat at exactly the same frame content. In absence of the link 302 the processing unit 301 could provide a -7 compliant stream with equal packet counters and timestamps but with different video content (as in one frame shifted).

For the sake of clarity, it is noted that either processing card 202a and 202b can take on the role of the Master while the other processing card takes on the role of the Slave.

For further describing the functionality of the system 300, it is assumed that initially the system 300 operates normally with processing card 202a functioning as a Master for processing card 202b that is the corresponding Slave. If processing block 109b fails in this situation, the processed data from processing card 202b are looped through processing card 202a. As a result, the dual processing cards 202a, 202b output two -7 compliant data streams. Processing card 202b simultaneously takes over the role of the Master in the system 300 in the sense that it defines the new PTP timestamps and packet sequence numbers for the processed output data packets. If the defective processing card 202a is replaced, then processing card 202b remains to be the Master in the system 300. In this way any glitches in the timing of the data streams are securely avoided.

Figure 4:
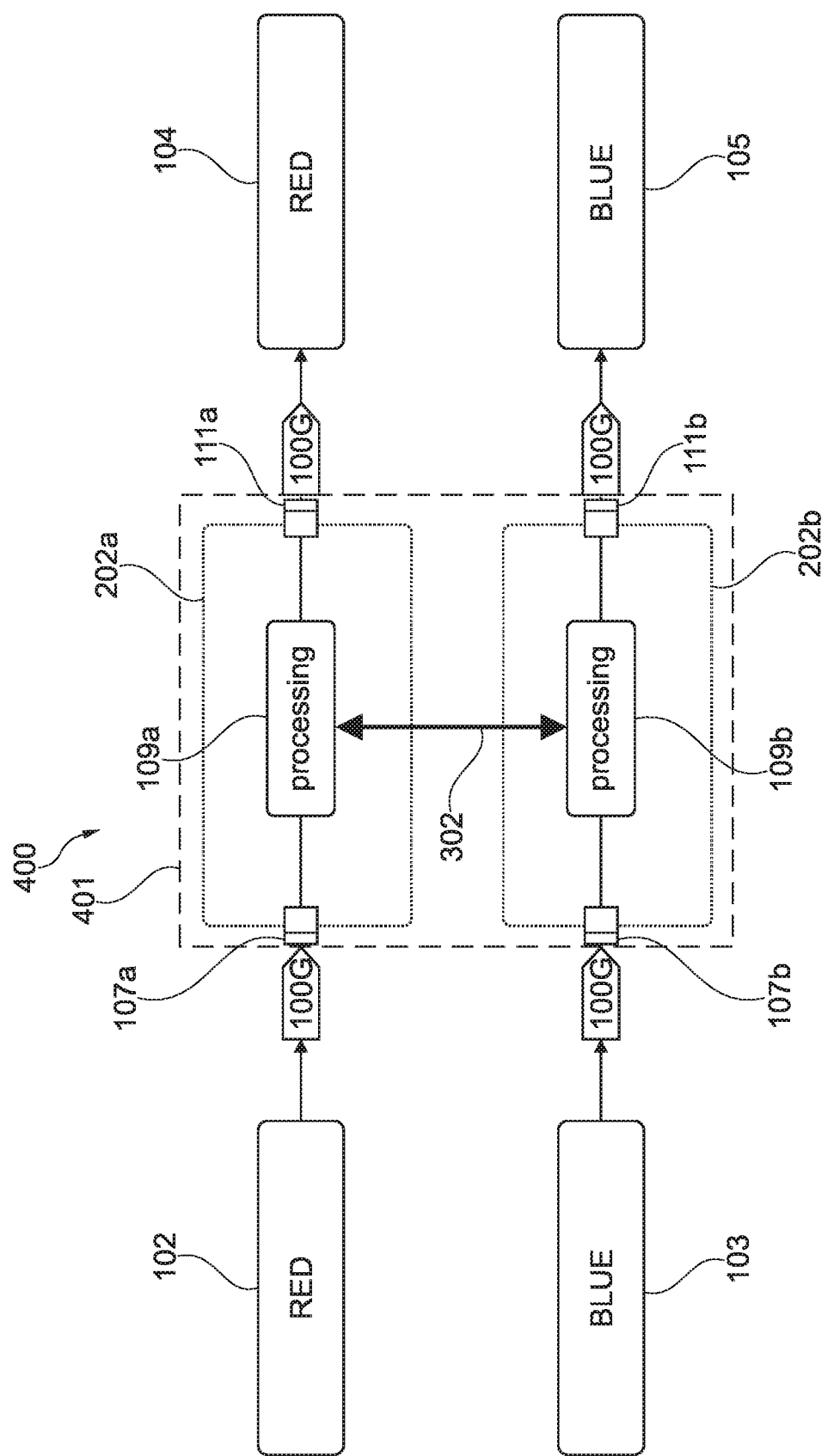
FIG. 4 illustrates the architecture of another media data transmission and processing system according to the present disclosure.

FIG. 4 shows the architecture of another media data transmission and processing system 400 according to the present disclosure. System 400 is designed for digesting big amounts of data, for example 8192 audio channels. Therefore, it includes a processing unit 401, which uses two individual processing cards 202a, 202b which are working in parallel to handle the enormous amount of data The Master and Slave status between the processing cards 202a, 202b is established in the same way as it has been described with reference to the embodiment shown in FIG. 3. The commands between the processing cards 202a, 202b are transmitted via the link 302. The link 302 enables to assign identical time stamps and packet counter numbers to the streams of processed output data streams, which are consequently -7 compliant. The output data streams are provided at connectors 111a, 111b as output streams to RED network 104 and the BLUE network 105, respectively.

In contrast to processing unit 301, the processing unit 401 in FIG. 4 has no cross-connections 203, 204 between the processing blocks 109a and 109b. Failure of one of the processing cards 202a, 202b in the processing unit 401 therefore entails failure of RED network 104 or BLUE network 105. The failure of network 104 or 105 must be handled by a downstream -7 compliant receiver, such as -7 compliant device 101 or processing unit 301. This will be explained in further detail with reference to FIG. 5.

Figure 5:
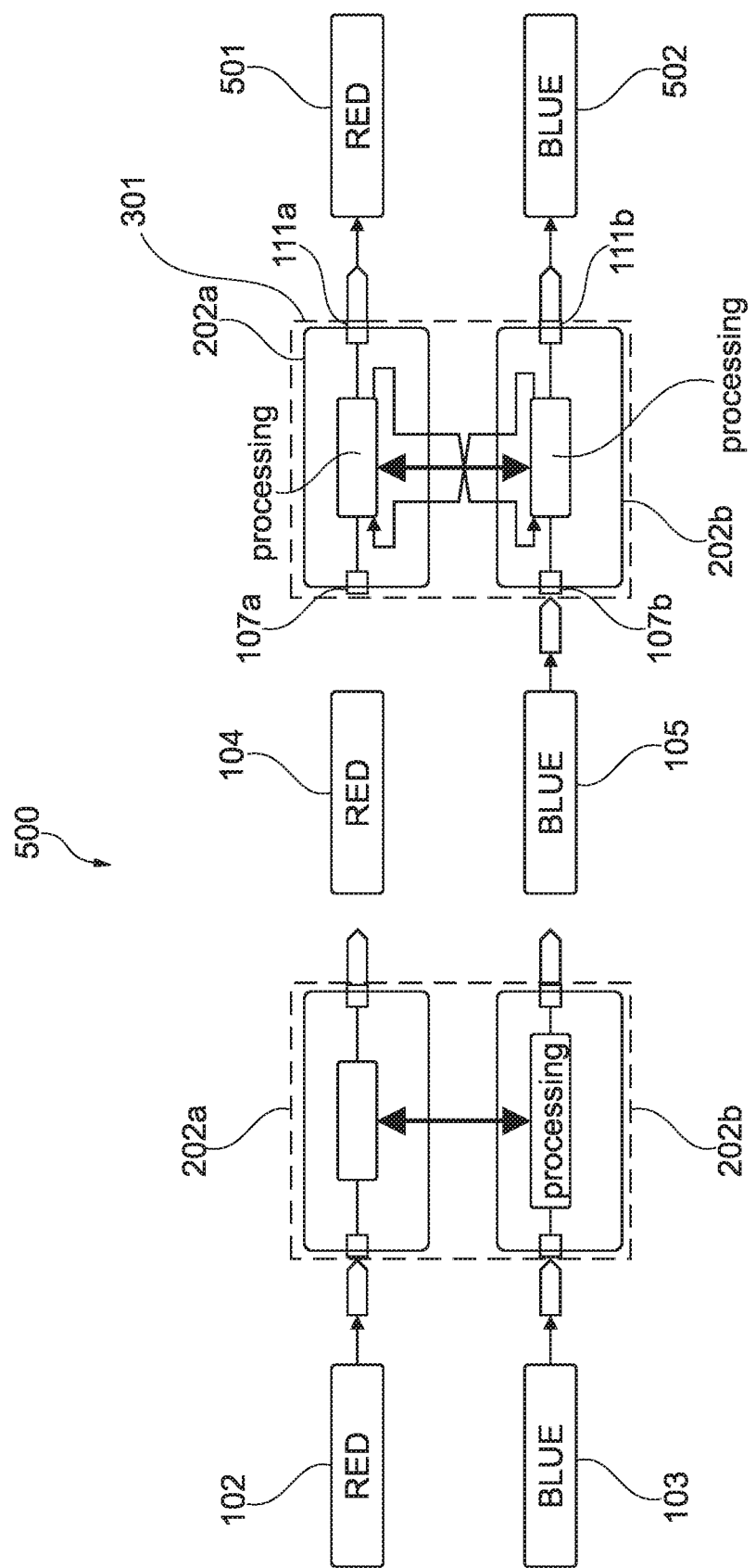
FIG. 5 illustrates a data transmission and processing system comprising one processing unit according to FIG. 3 and one processing unit according to FIG. 4.

FIG. 5 shows a data transmission and processing system 500 comprising an upstream processing unit 401 and a downstream processing unit 301. Processing unit 401 receives the redundant -7 compliant data streams from RED network 102 and BLUE network 103. Processing unit 401 outputs processed data to red network 104 and blue network 105, which at the same time are input networks for processing unit 301. FIG. 5 exhibits the situation when processing card 202a fails. Then the downstream RED network 104 receives no output data from processing card 202a. In contrast to that processing card 202b of processing device 401 remains to be operative and outputs the processed data stream to BLUE network 105. Due to the failure of RED network 104, no input data are supplied to connector 107a of processing device 301. As it has been described with reference to FIG. 3, processing unit 301 is capable of reestablishing two -7 compliant output data streams which are supplied to RED network 501 and BLUE network 502. Even if also processing card 202a of processing unit 301 fails at the same time, this has no impact on the downstream signals supplied to RED network 501 and BLUE network 502. Only if at the same time processing card 202b of processing unit 301 fails at the same time as processing card 202a of processing unit 401, then all data in downstream networks 501, 502 would be lost. Obviously, the simultaneous failure of two processing cards is very unlikely.

The failure of processing card 202b in processing unit 401 is handled by the transmission system 500 in a corresponding way.

In summary, the present disclosure suggests providing a physical bidirectional link between the main and the redundant half of a dual processing card solution in a processing unit, running a Master Slave algorithm to align the PTP timestamps and the packet counters in the downstream signals of the processing unit. This concept enables a full ST2022-7 compliant redundant stream that will be accepted by any -7 compliant receiver.

The connection 302 between the processing cards 202a and 202b is agnostic to which processing card functions as a Master and which one functions as a Slave. This prevents timing issues during alignment after a defective processing card is replaced. The processing card that starts the fastest will become Master, the other one Slave. When a Master is no longer operative the Slave becomes Master. A rebooted (repaired) processing card that is getting online will become Slave to the new Master, even though this processing card has been Master prior it failed.

Figure 6:
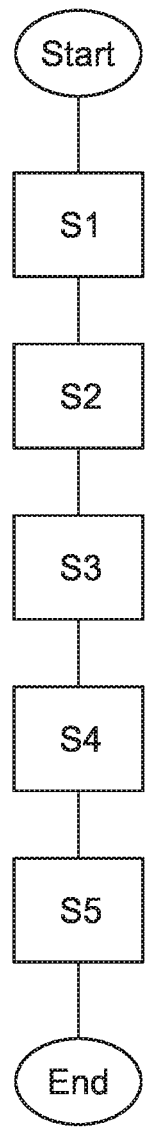
FIG. 6 illustrates a schematic flow diagram of a method for operating media data transmission and processing system.

FIG. 6 shows a schematic flow diagram of a method for operating the media data transmission and processing system described in the present disclosure. In a first step S1 a first input stream of IP packets is ingested into the first processing card 202a, wherein the IP packets contain media information, a PTP timestamp and a packet counter number. In a next step S2 card a second input stream of IP packets is ingested into the second processing card 202b, wherein the IP packets contain media information, a PTP timestamp and a packet counter number. In step S3 the first and second stream of IP packets are processed in the first and second processing card 202a, 202b, respectively, to produce first and second output streams. In step S4 one processing card is determined as a Master processing card and the other processing card as a Slave processing card. Finally, in step S5 new PTP timestamps and packet counter numbers to the first and second output streams are assigned such that the new PTP timestamps and packet counter numbers generated in the Master processing card are also assigned to the data packets processed in the Slave processing card.

The embodiments in the detailed description have been described for illustrative purposes. Other embodiments may be used in addition or instead. Details that may be apparent or unnecessary have been omitted to save space or for a more effective presentation. Some embodiments may be practiced with additional components or steps and/or without all components or steps that are described.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

| Reference List | |
|---|---|
| 100 | transmission system |
| 101 | - 7 compliant device |
| 102, 104 | RED network |
| 103, 105 | BLUE network |
| 107a, b | Connector |
| 108 | Packet selector |
| 109a, b | Processing block |
| 111a, b | Connector |
| 200 | Transmission system |
| 201 | Processing unit |
| 202a, b | Processing card |
| 203, 204 | Cross-connection |
| 300 | Transmission system |

-continued

| Reference List | |
|---|---|
| 301 | Processing unit |
| 302 | Interconnection |
| 303a, b | Probing engine |
| 400 | Transmission system |
| 401 | Processing unit |
| 500 | Transmission system |
| 501 | RED network |
| 502 | BLUE network |

The invention claimed is:

1. A media data transmission and processing system comprising
a first and a second data transmission network transmitting the same multimedia data as a first and a second stream of Internet Protocol (IP) packets, wherein the IP packets contain media information, a Precision Time Protocol (PTP) timestamp and a packet counter number, wherein for every packet in the first stream, the second stream contains a packet with identical media information, PTP timestamp, and sequence number,
a processing unit that integrates a first and a second processing card, wherein
the first processing card is to receive a first input stream that is the first stream of IP packets provided by the first data transmission network, process the first input stream and output a first output stream, wherein the IP packets of the first output stream have new PTP timestamps and sequence numbers, and
the second processing card is to receive a second input stream that is the second stream of IP packets provided by the second data transmission network, process the second input stream and output a second output stream, wherein the IP packets of the second output stream have new PTP timestamps and sequence numbers, and
an interconnection between the first processing card and the second processing card, wherein
one of the first processing card and the second processing card is configured to act as a Master for the other of the first processing card and the second processing card, which is configured to act as a Slave;
the Master and Slave processing cards process the IP packets containing the same media information in a coordinated manner, in particular in a synchronous manner;
the Master processing card is configured to assign a new PTP timestamp and packet counter number to an IP packet currently processed in the Master processing card and to communicate the new PTP timestamp and packet counter number to the Slave processing card, and
the Slave processing card is configured to assign the PTP timestamp and packet counter number received from the Master processing card to the IP packet currently processed in the Slave processing card that contains the same media information as the IP packet currently processed in the Master processing card.

2. The media data transmission and processing system according to claim 1, wherein the interconnection between the first and the second processing cards is to exchange command signals therebetween.

3. The media data transmission and processing system according to claim 1, further comprising a first cross-connection that connects an output of the first processing card with an input of the second processing card, and a second cross-connection that connects an output of the second processing card with an input of the first processing card.

4. The media data transmission and processing system according to claim 3, wherein the first cross connection loops the processed first output stream through the second processing card and the second cross connection loops the processed second output stream through the first processing card.

5. The media data transmission and processing system according to claims 4, wherein the first processing card comprises a probing engine analyzing quality of data content of the first input stream, and selecting to output the processed second output stream received from the second processing block via the second cross-connection if an erroneous IP packet is detected in the first input stream; and the second processing card comprises a probing engine analyzing quality of data content of the second input stream, and selecting to output the processed first output stream received from the first processing block via the first cross-connection if an erroneous IP packet is detected in the second input stream.

6. The media data transmission and processing system according to claim 5, wherein each of the probing engines is configured to analyze the quality of the data content in the audio and/or video baseband domain to detect whether an IP packet meets predefined quality criteria.

7. The media data transmission and processing system according to claim 5, wherein each of the probing engines is configured to perform at least one of cyclic redundancy checks, freeze-frame detection, black frame detection, audio carrier loss and video carrier loss.

8. A method for operating the media data transmission and processing system of claim 1, the method comprising ingesting into the first processing card the first input stream of IP packets, wherein the IP packets contain media information, a PTP timestamp and a packet counter number;

ingesting into the second processing card the second input stream of IP packets, wherein the IP packets contain media information, a PTP timestamp and a packet counter number;

processing the first and second stream of IP packets in the first and second processing card, respectively, to produce the first and second output streams;

determining one of the first processing card and the second processing card as a Master processing card and the other of the first processing card and the second processing card as a Slave processing card;

generating new PTP timestamps and packet counter numbers for the one of the first and the second output streams processed in the Master processing card; and assigning the new PTP timestamps and packet counter numbers generated by the Master processing card to the other of the first and second output streams processed in the Slave processing card.

9. The method according to claim 8, further comprising analyzing each input data stream to detect one or several erroneous data packets; and replacing the one or several detected erroneous data packets in one input data stream by processed data packets with the same media information from the other input stream.

10. The method according to claim 9, wherein the analyzing each input data stream involves analyzing the data content of the input stream in the audio and/or video baseband domain to detect whether a data packet meets predefined quality criteria.

11. The method according to claim 9, wherein the analyzing each input data stream comprises performing at least one of cyclic redundancy checks, freeze-frame detection, black frame detection, audio carrier loss and the video carrier loss.

12. The method according to claim 8, wherein the determining one of the first processing card and the second processing card as a Master processing card includes assigning a Master status to the one of the first processing card and the second processing card that has finished booting faster; and assigning the other of the first processing card and the second processing card a Slave status.

13. The method according to claims 8, further comprising if the processing card that has initially been assigned with the Master status fails, assigning the Master status to the processing card that initially has been assigned with the Slave status.

14. The method according to claim 8, further comprising replacing a failed processing card with a new processing card, and assigning the new processing card the Slave status.

15. A distributed video production system comprising the media data transmission and processing system according to claim 1.

* * * * *